(12) United States Patent
Nishiguchi et al.

(10) Patent No.: US 7,629,395 B2
(45) Date of Patent: Dec. 8, 2009

(54) INKJET PIGMENT INK

(75) Inventors: Kenji Nishiguchi, Yokohama (JP); Yuko Nishiwaki, Mitaka (JP)

(73) Assignee: Canon Kabushiki Kaisha, Tokyo (JP)

( * ) Notice: Subject to any disclaimer, the term of this patent is extended or adjusted under 35 U.S.C. 154(b) by 37 days.

(21) Appl. No.: 11/760,260

(22) Filed: Jun. 8, 2007

(65) Prior Publication Data
US 2007/0287770 A1    Dec. 13, 2007

(30) Foreign Application Priority Data
Jun. 12, 2006   (JP) ............................. 2006-162273

(51) Int. Cl.
C09D 11/00       (2006.01)
(52) U.S. Cl. .................. 523/160; 524/556; 524/558
(58) Field of Classification Search ................ 523/160
See application file for complete search history.

(56) References Cited

U.S. PATENT DOCUMENTS

| | | | | |
|---|---|---|---|---|
| 4,723,129 A | 2/1988 | Endo et al. | ................ | 346/1.1 |
| 4,740,796 A | 4/1988 | Endo et al. | ................ | 346/1.1 |
| 4,849,774 A | 7/1989 | Endo et al. | ............. | 346/140 R |
| 5,122,814 A | 6/1992 | Endo et al. | ................ | 346/33 R |
| 5,159,349 A | 10/1992 | Endo et al. | ................ | 346/33 A |
| 5,519,085 A * | 5/1996 | Ma et al. | ................ | 524/503 |
| 5,521,621 A | 5/1996 | Endo et al. | ................ | 347/15 |
| 5,754,194 A | 5/1998 | Endo et al. | ................ | 347/15 |
| 6,117,921 A * | 9/2000 | Ma et al. | ................ | 523/161 |
| 2004/0212667 A1 | 10/2004 | Nishiguchi | ................ | 347/96 |
| 2005/0075418 A1 | 4/2005 | Nishiguchi | ................ | 523/160 |
| 2007/0287769 A1 | 12/2007 | Nishiwaki et al. | ............ | 523/160 |

FOREIGN PATENT DOCUMENTS

| | | |
|---|---|---|
| JP | 55-157668 | 12/1980 |
| JP | S61-059911 | 12/1986 |
| JP | S62-001426 | 1/1987 |
| JP | 3-160068 | 7/1991 |
| JP | 4-018427 | 1/1992 |
| JP | 2002-030235 | 1/2002 |

* cited by examiner

*Primary Examiner*—David Wu
*Assistant Examiner*—Vu Nguyen
(74) *Attorney, Agent, or Firm*—Fitzpatrick, Cella, Harper & Scinto

(57) ABSTRACT

An inkjet pigment ink containing a pigment, a water-soluble solvent, water, and a copolymer. The copolymer is obtained by copolymerization of: aromatic acrylate (monomer A); (meth)acrylate added with ethylene oxide having a polymerization degree of 5 or more (monomer B); and acrylic acid (monomer C).

4 Claims, 3 Drawing Sheets

INKJET PIGMENT INK

BACKGROUND OF THE INVENTION

1. Field of the Invention

The present invention relates to an inkjet pigment ink that provides a recording product with an excellent abrasion resistance even in the case of using glossy paper smoothed with a surface coat, while having excellent ejection stability from an inkjet nozzle and

2. Description of the Related Art

An inkjet recording method performs a recording operation such that small droplets of a recording liquid (ink) are caused to fly to be attached onto a recording medium, such as paper. As an ink ejection means, there is known, for example, a method of ejecting a liquid droplet involving imparting thermal energy to the ink using an electro-thermal converter as means for supplying ejection energy (thermal inkjet method) to generate an air bubble in the ink. According to the method described above, in particular, a recording head having high-density multi-orifices can be realized, thereby being capable of recording (printing or producing) an image with high resolution and high quality at high speed (Japanese Patent Publication No. S61-59911).

On the other hand, as the coloring materials to be contained in the inks, dyes, which dissolve in ink solvents, are conventionally mainly used. However, from the viewpoints of light resistance and water resistance, the coloring materials made of pigments are now being investigated. The pigment inks are sometimes inferior to the dye inks in abrasion resistance, because the pigment inks perform the printing by attaching pigment onto a surface of the recording medium. In addition, it is pointed out that the pigment inks lose their glossiness depending on the kinds of the recording media to be used and the particle diameters of pigment.

Heretofore, the addition of a resin to the pigment ink has been examined to improve the abrasion resistance of an image. In other words, this method intends to fix the pigment onto the surface of the recording medium by the resin to be added in the ink. However, when the resin is made of a water-soluble polymer, the addition of a sufficient amount of the resin for fixation of the pigment to the ink leads to an increase in viscosity of the ink, thereby resulting in, for example, poor ejection stability. In contrast, Japanese Patent Publication No. S62-001426, Japanese Patent Application Laid-Open No. S55-157668, Japanese Patent Application Laid-Open No. H03-160068, and Japanese Patent Application Laid-Open No. H04-18427 proposes the addition of a water-soluble resin emulsion to the pigment ink to decrease the viscosity of the ink and to improve ejection characteristics. However, after the printing, the pigment and the resin emulsion are independently present on the surface of the recording medium, so the resin emulsion can be hardly effective to fix the pigment, thereby resulting in poor abrasion resistance of the ink.

In contrast to this, an ink set for improving the abrasion resistance and the glossiness is proposed as described below (Japanese Patent Application Laid-Open No. 2002-30235). The document discloses that the ink contains a pigment and fine particles of a thermoplastic resin with a glass transition temperature of from 50° C. to 150° C. The resulting image after the printing is heated at the glass transition temperature of the resin fine particles or more to melt the resin particles, thereby combining the pigment and the resin components. More specifically, the resin fine particles are molten to form a film, and the pigment and the resin components are then combined in the film to fix the pigment on the surface of the recording medium, thereby improving the abrasion resistance of the ink. However, the technology requires a step of heating in the process of image formation. Therefore, more excellent ink in respect of clogging resistance and storage stability is desired.

SUMMARY OF THE INVENTION

Therefore, it is an object of the present invention to provide an inkjet pigment ink containing an inkjet-recording pigment, which realizes high ejection stability and storage stability, and with which a print recorded on glossy paper with the ink shows high abrasion resistance.

An inkjet pigment ink comprises a pigment, a water-soluble solvent, water, and a copolymer, in which the copolymer is obtained by copolymerization of: aromatic acrylate (monomer A); (meth)acrylate added with ethylene oxide having a polymerization degree of 5 or more (monomer B); and acrylic acid (monomer C).

Further features of the present invention will become apparent from the following description of exemplary embodiments with reference to the attached drawings.

DESCRIPTION OF THE EMBODIMENTS

Figure 1:
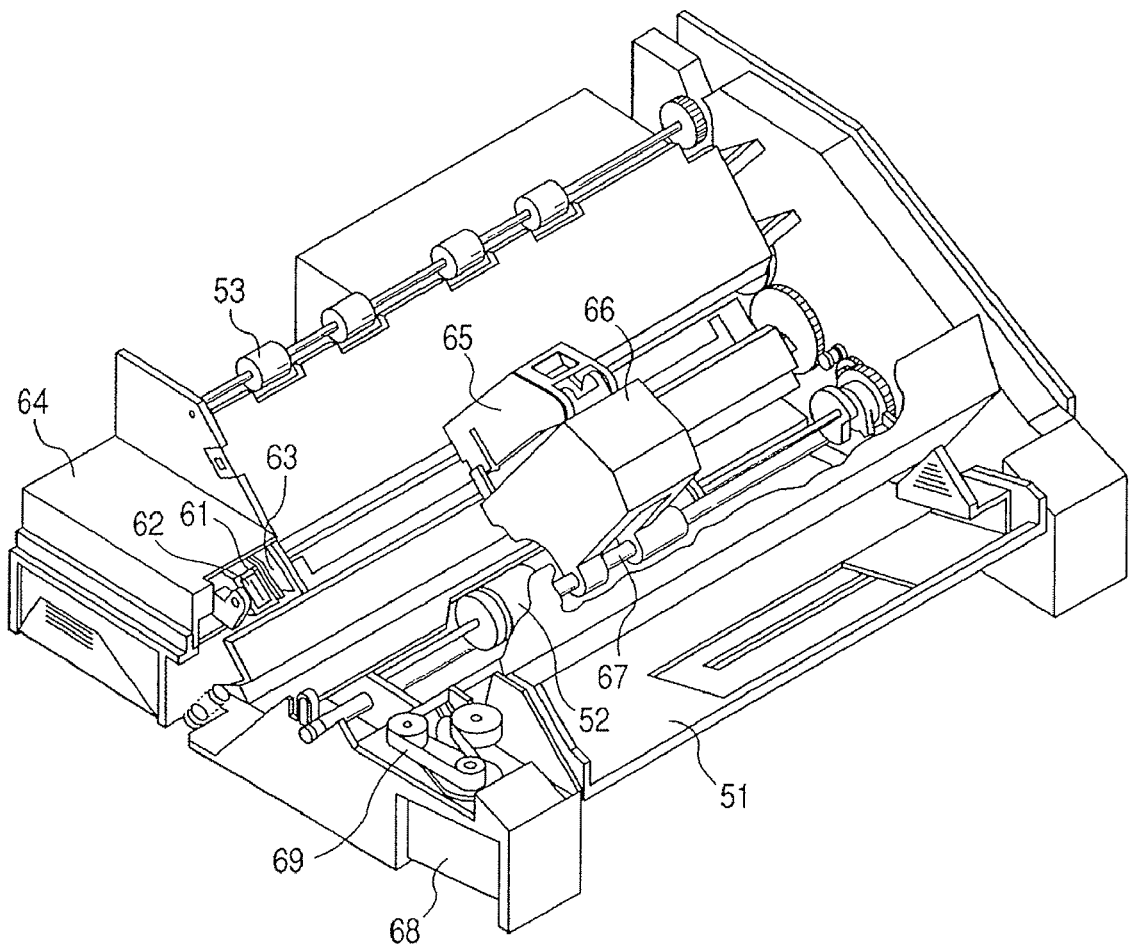
FIG. 1 is a perspective view showing an example of an inkjet recording apparatus.

Hereinafter, each component of an inkjet pigment ink of the present invention (hereinafter, also referred to as ink or pigment ink) will be described by way of preferred embodiments.

The inkjet pigment ink of the present invention contains a copolymer obtained by copolymerization of: monomer (A), aromatic acrylate; monomer (B), -(meth)acrylate added with ethylene oxide having a polymerization degree of 5 or more; and monomer (C), acrylic acid.

Specific examples of the aromatic acrylate (monomer A) used in the present invention include: aryl alcohol esters of acrylic acid such as benzyl acrylate, 2-phenoxy ethylacrylate, 2-phenoxy diethylene glycol acrylate, 2-phenoxy polyethylene glycol acrylate, 2-hydroxy-3-phenoxy propyl acrylate, paracumyl phenoxy ethyleneglycol acrylate, and 2-acryloyloxyethyl phthalate. Of those, for more improvement in abrasion resistance of an image, benzyl acrylate may be used.

In addition, specific examples of the (meth)acrylate added with ethylene oxide having a polymerization degree of 5 or more include: NK Ester AMP-60G, AM-90G (methoxy polyethylene glycol 400 acrylate, average polymerization degree is 9), AM-130G (methoxy polyethylene glycol 550 acrylate, average polymerization degree is 13), AM-230G (methoxy polyethylene glycol 1000 acrylate, average polymerization degree is 23), A-OC-18-E, M-90G (methoxy polyethylene glycol 400 methacrylate, average polymerization degree is 9), M-230G (methoxy polyethylene glycol 1000 methacrylate, average polymerization degree is 23), and OC-18E (which are names of products manufactured by Shin-Nakamura Chemical Co., Ltd.); Blemmer PE-200 (polyethylene glycol monomethacrylate, average polymerization degree is 5), PE-350 (polyethylene glycol monomethacrylate, average polymerization degree is 8); AE-200 (polyethylene glycol monoacrylate, average polymerization degree is 5), and AE-400 (polyethylene glycol monoacrylate, average polymerization degree is 10); 55PET-400 (poly(ethylene glycol-tetramethylene glycol) monomethacrylate, average polymerization degree is 5), 30PET-800 (poly(ethylene glycol-tetramethylene glycol) monomethacrylate, average polymerization degree is 55), and 55PET-800 (poly(ethylene glycol-tetramethylene glycol) monomethacrylate, average polymerization degree is 10); PME-400 (methoxy polyethylene glycol monomethacrylate, average polymerization degree is 9), PME-1000 (methoxy polyethylene glycol monomethacrylate, average polymerization degree is 23), and PME-4000 (methoxy polyethylene glycol monomethacrylate, average polymerization degree is 90); AME-400 (methoxy polyethylene glycol monoacrylate, average polymerization degree is 9); 50POEP800B (octhoxy polyethylene glycol-polypropylene glycol monomethacrylate, average polymerization degree is 8); 50AOEP800B (octhoxy polyethylene glycol-polypropylene glycol monoacrylate, average polymerization degree is 8); and Blemmer AEP, Blemmer AET, Blemmer PLE, Blemmer ALE, Blemmer PSE, and Blemmer ASEP (which are names of products manufactured by NOF Corporation). Of those, for more improvement in abrasion resistance of an image, any of AM-90G, M-90G, PE-350, and AE-400 may be used.

Further, the monomer C used in the present invention is acrylic acid. The copolymer used in the present invention may be one prepared by copolymerization of monomers having acidic functional groups other than acrylic acid. The monomers having acidic functional groups, which may be used in the present invention, include vinyl compounds having acidic functional groups. For example, methacrylic acid, maleic acid, maleic acid half ester, itaconic acid, itaconic acid half ester, fumaric acid, fumaric acid half ester, vinyl sulfonic acid, or vinyl phosphonic acid may be copolymerized.

The copolymer having the structure as described above, which may be used as a constituent of the ink of the present invention, has a weight average molecular weight of preferably in the range of 1,000 to 30,000, more preferably in the range of 3,000 to 15,000. In addition, the copolymer used in the present invention employs acrylic acid as the monomer C. The component ratio of the monomer having an anionic functional group in the copolymer is in a range of preferably 50 mg KOH/g to 300 mg KOH/g, more preferably 80 mg KOH/g to 200 mg KOH/g in terms of acid value. If the acid value is lower than such range, the dispersion stability of the pigment ink decreases and the ejection stability thereof may tend to deteriorate. In contrast, if the acid value is higher than the range, the adhesive force of the copolymer to the surface of the pigment decreases and the storage stability of the pigment ink may tend to decrease. Further, the weight average molecular weight or acid value of the copolymer or polymer in the present invention can be determined using routine procedures.

The ink of the present invention can be prepared so that acrylic acid for the formation of a copolymer to be contained or a monomer having an acidic functional group to be additionally introduced as described above can be ionized to adjust the whole ink to neutral or alkalinity to attempt to stabilize the dispersion of pigment particles. However, if the alkalinity is too strong, various structural components used in the inkjet recording apparatus may become corroded. Thus, the ink may preferably be at a pH value of 7 to 10. A pH adjuster used in this case may be any of various organic amines such as diethanol amine and triethanol amine; inorganic alkaline agents such as alkali-metal hydroxides, for example, sodium hydroxide, lithium hydroxide, and potassium hydroxide; organic acids; and mineral acids. The copolymers as described above can be dispersed or dissolved in aqueous liquid media.

Such copolymers may preferably be used as pigment dispersants to be attached onto pigment particles. This is because, when the copolymer is only dissolved in an ink solution, the copolymer may be penetrated into the recording medium and may not function to firmly attach the pigment particles to the surface of the recording medium.

Further, the copolymer used in the present invention can be one of a block copolymer and a graft copolymer having a hydrophilic segment and a hydrophobic segment. In particular, the copolymer may be a graft copolymer having a hydrophobic segment as a main chain unit and a hydrophilic segment as a side chain unit. If an aqueous pigment ink contains a polymer having such a structure, the hydrophobic main chain of the polymer is adsorbed at high density on the surface of the pigment and the hydrophilic side chain of the polymer extends in an aqueous solvent effectively, thereby providing the pigment with a larger repulsive force. As a result, the dispersion stability of pigment ink may be further improved. Further, the hydrophobic segment is a segment obtained mainly by polymerization of hydrophobic monomers, while the hydrophilic segment is a segment obtained mainly by polymerization of hydrophilic monomers.

More specifically, 50% by mass or more of monomers for forming the hydrophobic segment may be constituted of those having hydrophobic functional groups. The monomers having hydrophobic functional groups include, in addition to the essential aromatic acrylate (monomer A) in the present invention as described above, the monomers such as aromatic methacrylate, methyl(meth)acrylate, ethyl (meth)acrylate; n-propyl(meth)acrylate, isopropyl (meth)acrylate, n-butyl (meth)acrylate, isobutyl (meth)acrylate, tert-butyl(meth) acrylate, n-hexyl (meth)acrylate, n-octyl(meth)acrylate, 2-ethylhexyl (meth)acrylate; alkyl(meth)acrylate esters such as lauryl(meth)acrylate and stearyl(meth)acrylate; and alicyclic (meth)acrylate esters such as cyclrohexyl (meth)acrylate and isobornyl(meth)acrylate.

For the abrasion resistance enhancement, it is effective to bring pigment particles into close contact with each other by hydrophobic interaction of copolymer. The copolymer having a hydrophobic segment in which hydrophobic monomers are contained in a high copolymerization ratio functions to improve the hydrophobic interaction between pigment particles, thereby attaining an improvement in abrasion resistance.

In the present invention, as monomers for the formation of a hydrophobic segment, aromatic acrylate (monomer A) and (meth)acrylate added with ethylene oxide having a polymerization degree of 5 or more (monomer B) may preferably be used. In this case, the composition ratio of the aromatic acrylate (monomer A) to the (meth)acrylate added with ethylene oxide having a polymerization degree of 5 or more (monomer B) may more preferably be 1:1 to 10:1 in mass ratio. The higher the percentage of the aromatic acrylate, the higher the hydrophobic interaction can be increased.

On the other hand, monomers having hydrophilic functional groups comprise 50% by mass or more of the monomers for the formation of the hydrophilic segment. In addition to the acrylic acid (monomer C) essential to the present invention as described above and the above vinyl compounds having acidic functional groups, the monomers having hydrophilic functional groups include compounds: for example, vinyl monomers having hydroxyl groups such as 2-hydroxyethyl(meth)acrylate, 2-hydroxypropyl (meth)acrylate, 2-hydroxybutyl(meth)acrylate; 3-hydroxypropyl(meth)acrylate, 4-hydroxybutyl (meth)acrylate, and glycerin (meth)acrylate; (meth)acryl amide, N-vinyl acetoamide, N-vinyl formamide, and morphoryl(meth)acrylamide.

For further improvement in dispersion stability, the percentage of the acrylic acid (monomer C) to the total mass of the monomers for forming a hydrophilic segment may preferably be 80% by mass or more because of the following reason: in water-based ink, like the one of the present invention, for improving the dispersion stability, it is important that ionic functional groups are made present on the surface of pigment particles in a high density in an ink solution to attain a high electrostatic repulsive force, thereby enhancing the repulsive force. Therefore, the use of a copolymer having a hydrophilic segment prepared by high-density (co)polymerization of acrylic acid providing an ionic functional group in an ink solution leads to an improvement in dispersion stability. Further, in the copolymer used in the present invention, the weight average molecular weight of the hydrophilic segment may preferably be in a range of 300 to 2,000. If the molecular weight is smaller than the range, an effect of being blocked as the hydrophilic segment may be hardly obtained. If the molecular weight exceeds the range, the dispersion stability may be decreased due to decrease in solubility of the entire copolymer.

Further, in the present invention, the acrylic acid (monomer C) may preferably be used as a monomer for the formation of the hydrophobic segment as described above. In this case, the mass ratio of the monomer A (aromatic acrylate) to the monomer C (acrylic acid) may preferably be 4:1 to 16:1. In other words, the copolymerization of the acrylic acid into the hydrophobic segment leads to an increase in solubility of the copolymer. Thus, it allows the copolymer to be stably adsorbed on the pigment particles in the process of manufacturing ink, leading to an improvement in dispersion stability of produced pigment ink. Further, one of the block copolymer and the graft copolymer can be prepared by copolymerization of the monomers using a method as described below.

The method of synthesizing the block copolymer may be any of known methods such as a living-cation polymerization method, a living-anion polymerization method, and a living-radical polymerization method. In particular, the copolymer used in the present invention may more preferably be prepared by the living-radical polymerization method because monomers having acidic functional groups with high polarity such as acrylic acid are used in the copolymerization of monomers.

For synthesizing the graft copolymer, any method known in the art may be used. The conventional methods of manufacturing graft copolymers roughly include a graft-from method in which branched monomers are polymerized from a backbone polymer, a graft-onto method in which a branched polymer is bonded to a backbone polymer, a graft-through method in which a backbone polymer is copolymerized with branched polymers, and a macro-monomer method. Of those, the macro-monomer method can make branched polymers known to facilitate polymer design, so it can be the most effective method with greater versatility as a method of synthesizing a graft copolymer.

In the ink of the present invention, the copolymer may preferably be contained in a total amount in the range of 0.1% by mass to 15% by mass based on the total mass of the ink. In addition, when the specified copolymer as defined in the present invention is used as a pigment-dispersing resin, the copolymer may preferably be contained in an amount in the range of 0.1% by mass to 8.0% by mass based on the total mass of the ink.

In the ink of the present invention, if required, natural resins such as rosin, shellac, starch, and synthetic resins other than the copolymers as described above may be used. In this case, the natural resin or the synthetic resin can be contained up to the degree that does not exceed the amount of the above copolymer added.

The ink of the present invention contains, in addition to the specific copolymer as defined in the present invention as described above and the resin to be added if required as described above, at least a pigment, a water-soluble solvent, and water. The additional components will be described below.

In terms of mass ratio, the ink of the present invention preferably contains a pigment in an amount in a range of 1% by mass to 20% by mass, more preferably of 2% by mass more to 12% by mass based on the total mass of the ink. In the present invention, any of pigments listed below may be used. First, black pigments, which may be used in the present invention, may be a carbon black manufactured by furnace method or channel method. For instance, preferred are these carbon blacks which have some characteristics including a primary particle diameter of 11 to 40 m$\mu$m (nm), a specific surface area of 50 to 400 $m^2$/g measured by BET method, a volatile matter content of 0.5 to 10% by mass, and a pH value of 2 to 10. Commercially available products having such characteristics include: Nos. 33, 40, 45, 52, 900, 2200B, 2300, MA7, MA8, MCF88 (all manufactured by Mitsubishi Chemicals Corporation); RAVEN 1255 (manufactured by Columbian Chemical Company); REGAL 330R, 400R, 660R, and MOGUL L (all manufactured by Cabot Corporation); Nipex 160IQ, Nipex 170 IQ, Nipex 75, Printex 95, Printex 90, Printex 35, and Printex U (all manufactured by Degussa Japan Co., Ltd.). Any of them may preferably be used.

Yellow pigments, which may be used in the present invention, include C. I. Pigment Yellow, 1, 2, 3, 13, 16, 74, 83, 109, 128, and 155. In addition, magenta pigments include C. I. Pigment Red 5, 7, 12, 48 (Ca), 48 (Mn), 57 (Ca), 57: 1, 112, 122: quinacridone solid solution, and C. I. Pigment Violet 19. Further, cyan pigments include C. I. Pigment Blue 1, 2, 3, 15: 3, 15: 4, 16, 22, and C. I. Vat Blue 4, and 6. Any additional pigment other than the above color pigments may be also used. Any of the pigments including the additional pigment may be used independently or in combination of two or more pigments. Needless to say, the present invention is not limited to any of the pigments. In addition to these pigments, other pigments, which have been newly manufactured, such as self-dispersion type pigments, can be also used.

An aqueous medium, which may be used in the formation of the ink of the present invention, is a mixture solvent of water with a water-soluble solvent. The water used can be ion-exchanged water (deionized water) but not tap water containing various ions.

Water-soluble solvents, which may be used in combination with water, include water-soluble organic solvents, for example, alkyl alcohols having 1 to 4 carbon atoms such as methyl alcohol, ethyl alcohol, n-propyl alcohol, isopropyl alcohol, n-butyl alcohol, sec-butyl alcohol, and tert-butyl alcohol; amides such as dimethyl formamide and dimethyl acetoamide; ketones or ketoalcohols such as acetone and diacetone alcohol; ethers such as tetrahydrofuran and dioxane; polyalkylene glycols such as polyethylene glycol and polypropylene glycol; alkylene glycols having alkylene groups with 2 to 6 carbon atoms such as ethylene glycol, 1,2-propane diol, 1-3-propane diol, triethylene glycol, 1,5-pentane diol, 1,2,6-hexane triol, thiodiglycol, hexylene glycol, 1,2-hexane diol, and diethylene glycol; glycerin; lower alkyl ethers of polyvalent alcohols such as ethylene glycol monomethyl (or ethyl) ether, diethylene glycol methyl (or ethyl)ether, and triethylene glycol monomethyl (or ethyl) ether; N-methyl-2-pyrrolidone, and 2-pyrrolidone, 1-3-dimethyl-2-imidazolidinone. Among the water-soluble organic solvents, polyvalent alcohols such as diethylene glycol; and lower alkyl ethers of polyvalent alcohols such as triethylene glycol monomethyl (or ethyl)ether may be used.

The content of any of the above water-soluble organic solvents in ink is preferably in the range of 3% by mass to 50% by mass, more preferably in the range of 3% by mass to 40% by mass with respect to the total mass of ink. In addition, the content of water is preferably in the range of 10% by mass to 90% by mass, more preferably 30% by mass to 80% by mass with respect to the total mass of ink.

Further, the ink of the present invention may be further mixed with any of additives such as a surfactant, an antifoaming agent, and an antiseptic agent in a proper manner to make the ink to have desired values of physical properties when needed. The amount of any additive to be added may preferably be 0.05% by mass to 10% by mass, more preferably 0.2% by mass to 5% by mass with respect to the total mass of ink.

The method of preparing the ink containing the components as described above of the present invention may be, but not limited to, the following method: first, the pigment is added to an aqueous medium provided as a mixture of at least the copolymer with water, and the resultant is then mixed by stirring, subjected to a dispersion treatment with a dispersion device as described later, and if required subjected to a centrifugal separation treatment, thereby obtaining a desired pigment-dispersed solution. Subsequently, if required, to the pigment-dispersed solution is added a water-soluble solvent or any additive component properly selected such as one listed above, and the resultant is then stirred, and filtrated if needed, thereby providing the ink of the present invention.

Further, for well dissolving the copolymer used in the present invention in ink, a base can be added to the pigment-dispersed solution when it is prepared. Such a manner is able to improve the dispersion stability of ink. The bases, which may be used in this case, include organic amines such as monoethanol amine, diethanol amine, triethanol amine, amine methyl propanol, and ammonia; and inorganic bases such as potassium hydroxide, sodium hydroxide, and lithium hydroxide.

The method of preparing the pigment ink, as described above, uses a pigment-dispersion solution obtained by carrying out a dispersion treatment in preparation of ink. Before carrying out the dispersion treatment at the time of preparing the pigment-dispersed solution, it is effective to perform premixing. In other words, the premixing may be carried out so that any pigment is added to an aqueous medium provided as a mixture of at least the copolymer with water. Such a premixing operation can improve the wettability of the surface of the pigment to accelerate the adsorption of a dispersing agent on the surface of the pigment.

A dispersing device used for dispersing the above pigment may be any of those generally used in the art, such as a ball mill, a roll mill, a sand mill, a beads mill, and a nanomizer. Of those, the beads mill may be used. Examples of such a beads mill include Super Mill, Sand Grinder, Agitator Mill, Grain Mill, Dyno Mill, Pearl Mill, and Cobol Mill (all trade names).

The ink of the present invention is provided for inkjet recording, so the pigment may be one having the optimal particle size distribution. In other words, for suitably using an ink containing pigment particles in the process of inkjet recording, any pigment having the optimal particle size distribution may be used with the need of anti-clogging properties of nozzles. Examples of the process for obtaining a pigment having a desired particle size distribution include a process for reducing the size of a pulverization medium used in a dispersing device such as one described above, a process for increasing a filling rate of the pulverization medium, a process for extending a processing time period, and a process for classifying through a filter or using a centrifugal machine after pulverization, and a combination of the processes.

Inkjet Recording Method and Apparatus

Next, a recording apparatus, which may be used in the inkjet recording method of the present invention, will be described. An example of the recording apparatus suitable for recording with the ink of the present invention is one in which thermal or mechanical energy corresponding to a recording signal is applied on ink in the chamber of a recording head having an ink storage part where the ink is stored and an ink droplet is then generated by the energy.

FIG. 1 represents an example of the inkjet recording apparatus in which such a head is installed. In FIG. 1, reference numeral 61 denotes a blade provided as a wiping device. One end of the blade is retained by a blade-holding member and provided as a fixed end, forming a cantilever. The blade 61 is located at a position adjacent to a recording area using a recording head. In addition, in the case of the example shown in FIG. 1, the blade 61 is retained in protruded form on the transfer pathway along which the recording head travels. Reference numeral 62 is a cap located at a home position adjacent to the blade 61 and moves in the direction perpendicular to the traveling direction of the recording head. The cap 62 is designed to come to contact with the ejection surface of the recording head to perform a capping operation. Further, in FIG. 1, reference numeral 63 is an ink absorber provided adjacent to the blade 61 and retained like the blade 61 so as to protrude in the transfer pathway along which the recording head ravels.

The blade 61, the cap 62, and the absorber 63 construct a ejection recovering part 64. The blade 61 and the absorber 63 remove moisture, dust, and dirt from the ink-ejection orifice surface. Reference numeral 65 is the recording head having a ejection-energy-generating unit and carrying out a recording operation by ejecting ink onto a recording medium facing to the ejection surface thereof on which ejection orifices are arranged. Reference numeral 66 is a carriage on which the recording head 65 is mounted to move the recording head 65. The carriage 66 is slidably engaged with a guide axis 67 and part of the carriage 66 connects to a belt 69 to be driven by a motor 68. It allows the carriage 66 to move along the guide axis 67, while allowing the recording head 65 to move along a recording area and the adjacent areas thereof.

Reference numeral 51 denotes a sheet-feeding part for insertion of a recording medium and reference numeral 52 denotes a sheet-feeding roller to be driven by a motor not shown in the figure. Such structural components allow the recording medium to be fed to a position facing to the orifice surface of the recording head. As the recording proceeds, the recording medium is delivered to a sheet-delivering part provided with a sheet-delivering roller 53.

In the above configuration, when the recording head 65 returns to the home position after completing the recording, the cap 62 of the ejection recovering part 64 is evacuated from the transfer pathway on which the recording head 65 travels, while the blade 61 protrudes in the transfer pathway. As a result, the orifice surface of the recording head 65 can be wiped. Further, when the cap 62 abuts on the orifice surface of the recording head 65 to cap thereon, the cap 62 moves so that the cap 62 protrudes in the transfer pathway on which the recording head travels.

The cap 62 and the blade 61 are located on the same positions as those at the time of the above wiping operation when the recording head 65 moves from the home position to the position of initiating a recording operation. As a result, even in this travel, the orifice surface of the recording head 65 can be wiped. The movement of the recording head to the home position is not only performed at the time of completing the recording or recovery of the ejection, the recording head moves to the home position adjacent to a recording area at a predetermined space while the recording head is traveling along the recording area for recording. Thus, the above wiping is carried out along the travel.

Figure 2:
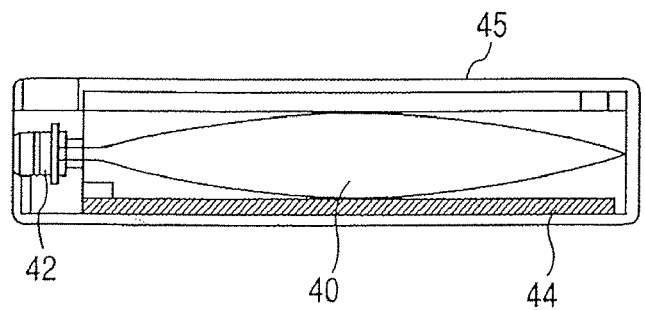
FIG. 2 is a vertical cross-sectional view of an ink cartridge.

FIG. 2 is a cross sectional view of an example of an ink cartridge 45 in which ink supplied through an ink-supplying member, such as a tube, is stored. Here, reference numeral 40 is an ink storage part, such as an ink bag, in which ink to be supplied is stored. The tip of the ink storage part is provided with a rubber plug 42. A needle (not shown) is inserted into the plug 42 to allow the ink to be supplied in the ink bag 40 to the head. Reference numeral 44 is an ink absorber for reserving waste ink.

Figure 3:
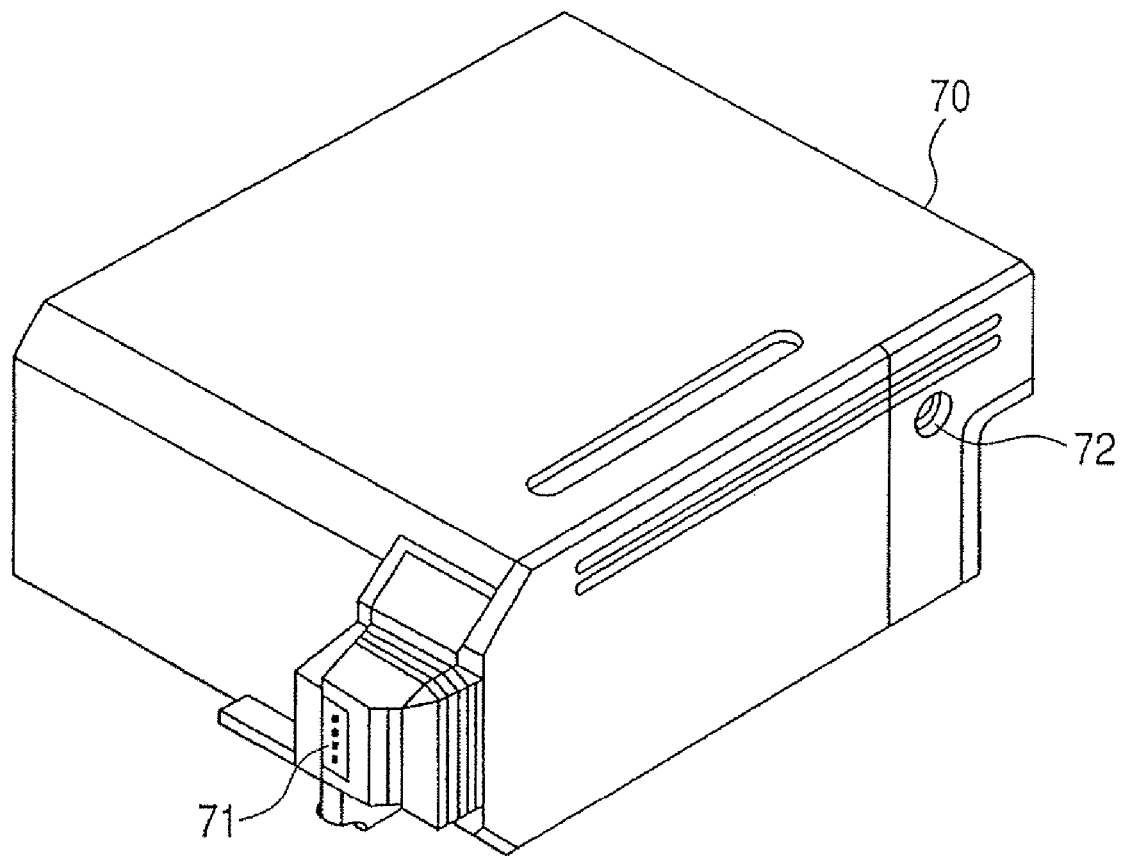
FIG. 3 is a perspective view of a recording unit.

The inkjet recording apparatus used in the present invention is not limited to one in which the recording head and the ink cartridge are independently provided as described above. The head and the ink cartridge may be integrally formed as shown in FIG. 3. In FIG. 3, reference numeral 70 denotes a recording unit in which an ink storage part for storing ink, for example an ink absorber is housed. The ink in the ink absorber is designed so that the ink is ejected as an ink droplet from a head part 71 having a plurality of orifices. Reference numeral 72 denotes an air-communication port for communicating the inside of the recording unit to the air. The recording unit 70 is used in stead of the recording head 65 shown in FIG. 1 and is detachable from the carriage 66.

Figure 4:
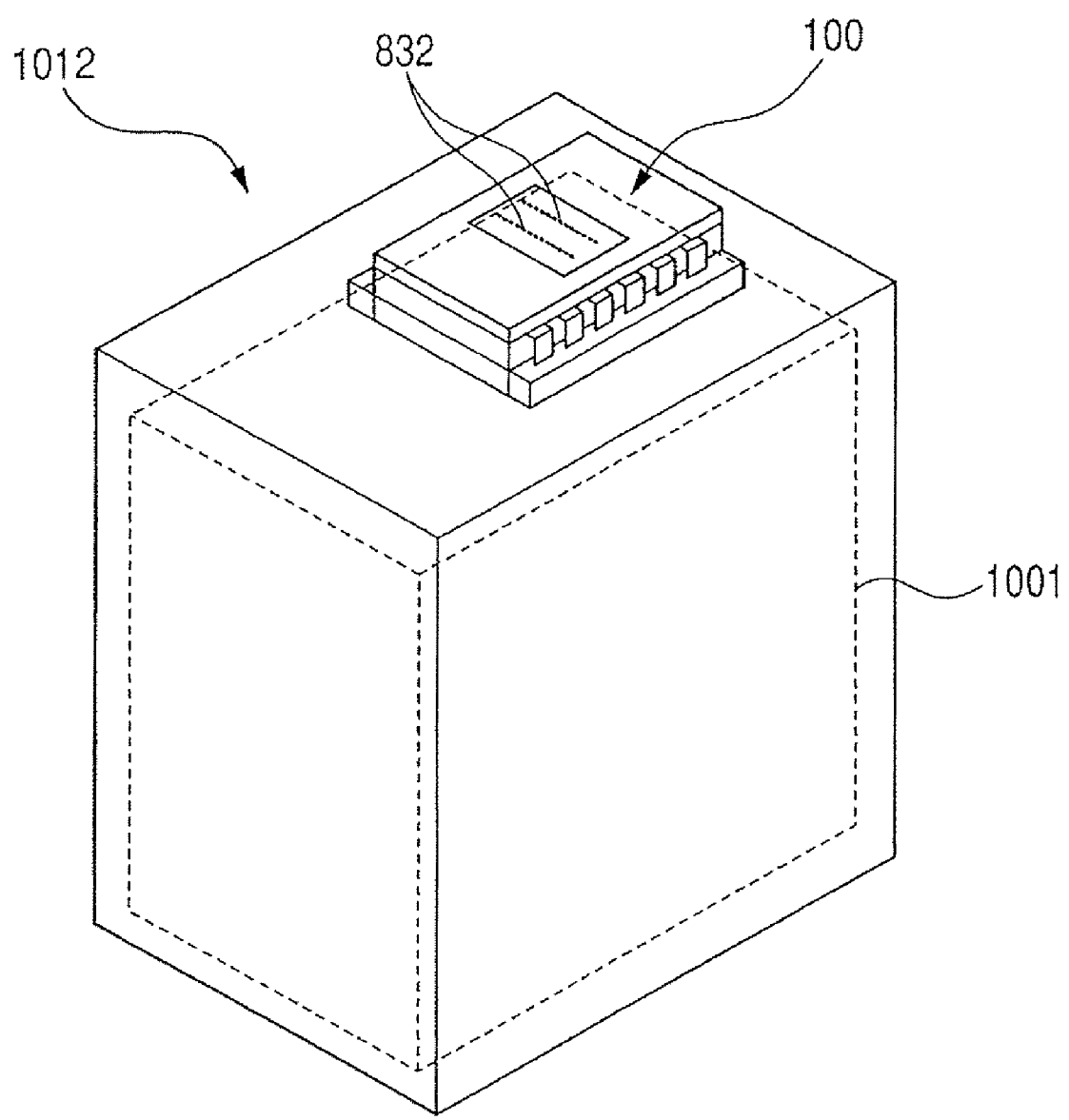
FIG. 4 is a schematic perspective view of an example of an inkjet cartridge with a liquid-ejecting head.

FIG. 4 illustrates an example of an inkjet cartridge that can be mounted on the above inkjet recording head. A cartridge 1012 of the present example is of a serial type and the main part thereof is constructed of an inkjet recording head 100 and a liquid tank 1001 for storing a liquid such as ink. The inkjet recording head 100 is provided with a plurality of ejection orifices 832 for ejecting the liquid. The liquid such as ink is arranged to be introduced from a liquid tank 1001 to a common liquid chamber of the liquid ejection head 100 through a liquid-supplying passage not shown in the figure. The cartridge 1012 shown in FIG. 4 is constructed so that the inkjet recording head 100 and the liquid tank 1001 are integrally formed and supplies the liquid into the liquid tank 1001 as need arises. Alternatively, it may be constructed so that the liquid tank 1001 can be replaced for the liquid ejection head 100.

EXAMPLES

Hereinafter, the present invention will be described in further detail with reference to examples and comparative examples. Here, in the following description, "part(s)" and "%" are mass bases as far as not specified.

In this example, a pigment ink in which a graft copolymer is used as dispersion resin will be described.

Preparation of Dispersion Resin A1
Preparation of Macromonomer B1

First, macromonomer B1 to be provided as a side chain unit of dispersion resin A1 was prepared. As a raw material of the macromonomer B1 forming the side chain unit, 20 parts of acrylic acid (monomer C) was used. In addition, 4 parts of α-methyl styrene dimmer as a chain transfer agent and 0.4 parts of azobisisobutyronitrile as a radical polymerization initiator were used. Then, in 300 parts of 1-methoxy-2-propanol, radical polymerization was carried out by dropping the above raw material under reflux with $N_2$ at a polymerization temperature of 110° C. for 3 hours. After completing the dropping, the polymerization reaction was carried out at 110° C. for additional 3 hours. Next, the reaction product was cooled to room temperature and then dispersed in 1,000 parts of hexane to remove the unreacted product by precipitation purification, followed by drying under reduced pressure to obtain macromonomer B1. In this case, the weight average molecular weight of the macromonomer B1 to be provided as the side chain unit of the dispersion resin A1 was 600.

Preparation of Dispersion Resin A1

Using 25 parts of macromonomer B1 having an anionic functional group obtained as described above, a side chain unit was formed to prepare dispersion resin A1 by the method described below. The above macromonomer B1 was previously dissolved in 300 parts of 1-methoxy-2-propanol, and to the resulting solution was then dropwise added a mixture of a monomer forming a main chain unit as described below with a polymerization initiator as described below, thereby carrying out the polymerization. The monomers constituting the main chain unit used were the following three types. Specifically, 60 parts of benzyl acrylate, a hydrophilic monomer provided as an aromatic acrylate (monomer A); 10 parts of NK Ester M-90G (manufactured by Sin-Nakamura Chemical Corporation.) as (meth)acrylate added with ethylene oxide having a polymerization degree of 5 or more (monomer B); and 10 parts of acryl ester (monomer C) were used. In addition, 4 parts of azobisisobutyronitrile was added as the radical polymerization initiator. Then, a mixture of the monomers with the radical polymerization initiator was dropped into 1-methoxy-2-propanol in which the macro-monomer B1 prepared in advance was dissolved, thereby carrying out the radical polymerization. At that time, the polymerization was carried out at a polymerization temperature of 110° C. under reflux of $N_2$ with a dropping period of 3 hours. After completing the dropping, the polymerization reaction was carried out at 110° C. for additional 3 hours. Subsequently, the reaction system was cooled to room temperature and then the reaction product was dispersed into 1,000 parts of hexane to remove the unreacted product by precipitation purification, followed by drying under reduced pressure to obtain dispersion resin A1. The resulting dispersion resin A1 is a graft copolymer, in which the main chain unit forms a hydrophobic segment, and the side chain unit forms a hydrophilic segment. The dispersion resin A1 has a weight average molecular weight of 5,800 and an acid value of 170 mgKOH/g. Further, the composition ratio of the monomer A to the monomer B in the hydrophobic segment is (monomer A):(monomer B)=6:1. Further, the composition ratio of the monomer A to the monomer C in the hydrophobic segment is (monomer A):(monomer C)=6:1.

Preparation of Pigment-Dispersed Liquid k1

| Composition of Pigment-Dispersed Liquid k1 | |
|---|---|
| Dispersion resin A1 | 15 parts |
| potassium hydroxide | 3 parts |
| Isopropyl alcohol | 10 parts |
| Ion-exchanged water | 57 parts |

First, the above components including the dispersion resin A1 previously prepared were mixed together and then heated at 70° C. in a water bath, thereby completely dissolving the resin content. To the solution, 15 parts of carbon black (MCF88, manufactured by Mitsubishi Chemical Corporation) was added and premixed for 30 minutes, followed by carrying out a dispersion treatment under the following conditions to obtain a pigment-dispersed liquid k1.

Dispersion Conditions

Dispersing device: Beads Mill UAM-015 (trade name) (manufactured by Kotobuki Industries, Co., Ltd.)

Pulverizing medium: Zirconia Beads 0.05 mm in diameter (manufactured by Tosoh Corporation)

Filling rate of pulverizing medium: 70% (volume ratio)

Pulverizing time: 1 hour

Preparation of Black Ink k1

The following components with the composition ratio including the pigment-dispersed liquid k1 prepared as described above were mixed together to prepare Black ink K1 according to routine procedures.

| | |
|---|---|
| Pigment-dispersed liquid k1 (3 parts in terms of pigment concentration) | 20 parts |
| Glycerin | 10 parts |
| Ethylene glycol | 5 parts |
| N-methyl pyrrolidone | 5 parts |
| Acetylanol EH (manufactured by Kawaken Fine Chemicals Co., Ltd.) | 1 part |
| Ion-exchanged water | 59 parts |

Evaluation

Evaluation of Abrasion Resistance on Glossy Paper

The abrasion resistance of black ink K1 of the present example prepared as described above was evaluated by the following procedures. Black ink K1 was packed in an ink cartridge and a printing matter was then recorded on a sheet of inkjet photo paper PR-101 (manufactured by Canon Inc.) using an inkjet printer PIXUS 850i (manufactured by Canon Inc.), providing a test sample. Then, the test sample thus obtained was subjected to a peeling test with a mending tape. The optical densities before and after the examination were measured. The ratio of the optical densities before and after the examination was then obtained and used in the evaluation. The obtained evaluation results are listed in Table 1.

Test A. Evaluation of Optical Densities Before and After Test

The optical densities of the sample obtained before and after the test as described above were determined using a reflection densitometer (manufactured by Gretag Macbeth). Then, the measured optical density levels of the printed matter were represented by $OD_1$ (before test) and $OD_2$ (after test) and the optical density ratio $ROD_1=OD_2/OD_1$ was determined and then evaluated on the basis of the following criterion.

Evaluation Criterion

□: $ROD_1>0.8$

○: $0.7<ROD_1\leq 0.8$

Δ: $0.6<ROD_1\leq 0.7$ x: $ROD_1\leq 0.6$

Evaluation of Ejection Stability

Test B. Test of Ejection Stability

The ejection stability of ink was evaluated by the following procedures with the following criterion. First, the continuous recording was carried out on 1,000 sheets of plain paper by means of the above-mentioned inkjet printer using ink K1.

After continuous recording of 1,000 sheets, a printed matter was formed on the inkjet photo paper by the same procedures as those described in "Evaluation of Abrasion Resistance On Glossy Paper". The resulting printed matter was then subjected to the same optical-density measurement as that of "Test A Evaluation of Optical Densities Before and After Test" described above. The resulting optical density was referred to as $OD_3$. Then, $ROD_2$ represented by the following equation was determined from the value of $OD_3$ and the optical density $OD_1$ measured by the same procedure as one carried out for the printed matter formed before the ejection durability test. Subsequently, these values were used in the evaluation with the following criterion. The results thus obtained are listed in Table 1.

$ROD_2=OD_3/OD_1$

Evaluation Criterion

□: $ROD_2>0.9$

○: $0.8<ROD_2\leq 0.9$

Δ: $0.6<ROD_2\leq 0.8$ x: $ROD_2\leq 0.6$

Storage Stability Test

Test C. Average Particle Diameter Measurement Before and After 60° C. Storage

The storage stability of ink was evaluated by the following procedures with the following criterion. The ink K1 was placed in a hermetically closed container and left in a thermostatic chamber at 60° C. for 24 hours, thereby obtaining ink after storage. Subsequently, the average particle diameters of particles in the ink before and after the storage test were determined using a particle-size-distribution measuring device (FPAR-1000, manufactured by Otsuka Electronics Co., Ltd.). Then, the ratio of the average particle diameter (before test) $PD_1$ and the average particle diameter (after test) $PD_2$ thus obtained, $RPD=PD_2/PD_1$, was obtained. The resulting value was used in the evaluation of the storage stability with the following criterion. The results thus obtained are listed in Table 1 below.

Evaluation Criterion

□: $0.9<RPD\leq 1.2$

○: $0.8<RPD\leq 0.9$ or $1.2<RPD\leq 1.4$

Δ: $0.7<RPD\leq 0.8$ or $1.4<RPD\leq 1.8$ x: $RPD\leq 0.7$ or $1.8<RPD$

TABLE 1

| | | Evaluation Results | | |
|---|---|---|---|---|
| Evaluation item | Ink No. | Test A Abrasion resistance | Test B Ejection stability | Test C Storage stability |
| Example 1 | K1 | □ | □ | □ |

As described above, the black ink K1 was ink having extremely excellent properties of abrasion resistance of an image and ejection stability and storage stability of ink.

Example 2

The present example describes a pigment ink containing a random copolymer prepared by copolymerization of monomer components A, B, and C.

Preparation of Resin A2

For the raw materials of resin A2, 43 parts of paracumyl phenoxy ethyleneglycol acrylate as monomer A, 51 parts of NK Ester M-230G (manufactured by Sin-Nakamura Chemical Co., Ltd.) as monomer B, and 6 parts of acrylic acid as monomer C were used. In addition, 4 parts of azobisisobutyronitrile was used as a radical polymerization initiator. A mixture of these monomers A, B, and C with the polymerization initiator was subjected to radical polymerization by dropping the mixture into 500 parts of 1-methoxy-2-propanol. At this time, the polymerization temperature was set to 110° C. and the dropping was then carried out for 3 hours under reflux of $N_2$. After completing the dropping, the polymerization reaction was carried out at 110° C. for additional 3 hours. Subsequently, the reaction product was cooled to room temperature and then dispersed in 1,000 parts of hexane to remove the unreacted product by precipitation purification, followed by drying under reduced pressure to obtain resin A2. The resin A2 is a linear random polymer prepared by copolymerization of monomers A, B, and C. The resin A2 thus obtained has an average molecular weight of 7,800 in terms of polystyrene, and an acid value of 47 mg KOH/g. Further, the composition ratio of the monomer A to the monomer B in the resin A2 is (monomer A):(monomer B)=0.84:1.

Preparation of Pigment-Dispersed Liquid k2

The following components including a commercially available polymer dispersion resin were mixed together and then heated in a water bath at 70° C., thereby completely dissolving the resin portion. To the resulting solution was added 15 parts of carbon black (MCF88, manufactured by Mitsubishi Chemical Corporation), which was the same one used in Example 1. Then, pigment-dispersed liquid k2 was prepared in the same manner as one described in Example 1.

| Composition of Pigment-Dispersed Liquid k2 | |
|---|---|
| JONCRYL 678 (manufactured by Johnson Polymer Corporation) | 5 parts |
| Potassium hydroxide | 1 parts |
| Isopropyl alcohol | 10 parts |
| Ion-exchanged water | 69 parts |

Preparation of Black Ink K2

The pigment-dispersed liquid k2 previously prepared was used and mixed with the following components with the composition ratio, thereby preparing Black ink K2.

| Composition of Black Ink K2 | |
|---|---|
| Pigment-dispersed liquid k2 (3 parts in terms of pigment concentration) | 20 parts |
| Resin A2 | 3 parts |
| Glycerin | 10 parts |
| Ethylene glycol | 5 parts |
| N-methyl pyrrolidone | 5 parts |
| Acetylanol EH (manufactured by Kawaken Fine Chemicals Co., Ltd.) | 1 part |
| Ion-exchanged water | 56 parts |

Evaluation

Black ink K2 was evaluated using the same evaluation procedures and the same evaluation criterion as those of Example 1. The evaluation results are listed in Table 2 as follows.

TABLE 2

| | | Evaluation Results | | |
|---|---|---|---|---|
| Evaluation item | Ink No. | Test A Abrasion resistance | Test B Ejection stability | Test C Storage stability |
| Example 2 | K2 | ○ | ○ | ○ |

Although the black ink K2 is a little inferior compared with the black ink K1 as described above, the black ink K2 was excellent with respect to the abrasion resistance of an image and the ejection stability and storage stability of an ink.

Example 3

In the present example, a pigment ink using a random copolymer prepared by copolymerization of components, monomers A, B, and C is described.

Preparation of Dispersion Resin A3

For the raw materials of the dispersion resin A3, 44 parts of 2-hydroxy-3-phenoxypropyl acrylate as monomer A, 50 parts of NK Ester AM-130G (manufactured by Sin-Nakamura Chemical Co) as monomer B, and 6 parts of acrylic acid as monomer C were used. In addition, 4 parts of azobisisobutyronitrile was used. Dispersion resin A3 was prepared in the same procedures as in the preparation of the resin A2 described in Example 2 except for using the above materials. The dispersion resin A3 is a linear random polymer in which the monomers A, B, and C components were copolymerized. The dispersion resin A3 thus obtained has a weight average molecular weight of 10,200 in term as polystyrene, and an acid value of 48 mg KOH/g. The composition ratio of the monomer A to the monomer B is (monomer A):(monomer B)=0.88:1.

Preparation of Pigment-Dispersed Liquid k3

Pigment-dispersed liquid k3 was prepared in the same manner as in Example 1 except for using the dispersion resin A3 prepared as described above in stead of the dispersion resin A1 used in the preparation of the pigment-dispersed liquid k1 in Example 1.

Preparation of Black Ink K3

Black ink K3 was prepared by the same composition and procedures as those in Example 1 except for using the pigment-dispersed liquid k3 in stead of the pigment-dispersed liquid k1 used in the preparation of the Black ink K1 carried out in Example 1.

Evaluation

The evaluation of Black ink K3 prepared as described above was evaluated according to the same evaluation procedures and evaluation criteria as those of Example 1. The evaluation results are shown in Table 3 below.

TABLE 3

| | | Evaluation Result | | |
|---|---|---|---|---|
| Evaluation item | Ink No. | Test A Abrasion resistance | Test B Ejection stability | Test C Storage stability |
| Example 3 | K3 | ○ | ○ | ○ |

Although the black ink K3 is a little inferior compared with the black ink K1 as described above, the black ink K3 was excellent with respect to the abrasion resistance of an image, and the ejection stability and storage stability of an ink.

Example 4

In this example, the use of a block copolymer containing a hydrophobic segment and a hydrophilic segment as a pigment-dispersed resin is described.

Preparation of Dispersion Resin A4

Preparation of Hydrophobic Segment b4

As a raw material of the hydrophobic segment b4, 44 parts of 2-phenoxyethyl acrylate was used as monomer A. In addition, it was mixed with 1 part of azobisisobutyronitrile as a radical polymerization initiator and 0.2 parts of α-(methyltrithiocarbonate)-S-phenyl acetic acid as a chain transfer agent, followed by synthesizing as follows: The above raw material mixture was deaerated under argon gas and polymerized for 20 hours in an oil bath at 70° C. As a result, the hydrophobic segment b4 of dispersion resin A4 was prepared. The resulting hydrophobic segment b4 has a weight average molecular weight of 2,600 in terms of polystyrene.

Preparation of Dispersion Resin A4

As raw materials of dispersion resin A4, 44 parts of hydrophobic segment b4 prepared as described above, 50 parts of Blemmer AE-400 (trade name, manufactured by NOF Corporation) as monomer B forming the hydrophilic block, and 6 parts of acrylic acid as monomer C forming the hydrophilic block were used. The material mixture and 0.4 parts of azobisisobutyronitrile as a radical polymerization initiator were dissolved in N,N-dimethylformamide and reacted for 20 hours in an oil bath at 70° C. under argon flow. After that, the reaction product was cooled to room temperature and then dispersed in 1,000 parts of hexane to remove the unreacted product by precipitation purification, followed by drying under reduced pressure to obtain dispersion resin A4. The resulting dispersion resin A4 is a block polymer in which the monomer A is polymerized in the hydrophobic segment and the monomers B and C are copolymerized in the hydrophilic segment. The dispersion resin A4 thus obtained had a weight average molecular weight of 6,400 in terms of polystyrene and an acid value of 47 mgKOH/g. Further, the composition ratio of the monomer A to the monomer B in the dispersion resin A4 is (monomer A):(monomer B)=0.88:1.

Preparation of Pigment-Dispersed Liquid k4

Pigment-dispersed liquid k4 was prepared in the same manner as in Example 1 except for using the dispersion resin A4 prepared as described above in stead of the dispersion resin A1 used in the preparation of the pigment-dispersed liquid k1 in Example 1.

Preparation of Black Ink K4

Black ink K4 was prepared using the same compositions and procedures as those of Example 1, except that the pigment-dispersed liquid k4 prepared as described above was used in stead of the pigment-dispersed liquid k1 used in the preparation of Black ink K1 in Example 1.

Evaluation

The evaluation of Black ink K4 prepared as described above was evaluated according to the same evaluation procedures and evaluation criteria as those of Example 1. The evaluation results are shown in Table 4 below.

TABLE 4

| | | Evaluation Results | | |
|---|---|---|---|---|
| Evaluation item | Ink No. | Test A Abrasion resistance | Test B Ejection stability | Test C Storage stability |
| Example 4 | K4 | □ | ○ | ○ |

As described above, Black ink K4 was excellent in any of the abrasion resistance of an image and the ejection stability and storage stability of the ink. In particular, with respect to the abrasion resistance of the image, Black ink K4 was excellent in the same level as that of Black ink K1.

Example 5

The present example describes the use of a block copolymer containing a hydrophobic segment and a hydrophilic segment, in which monomer C accounts for 80% or more of the monomers constituting the hydrophilic segment as a pigment dispersion resin.

Preparation of Dispersion Resin A5

Preparation of Hydrophilic Segment c5

As raw materials of the hydrophilic segment, 10 parts of NK Ester M-230G (trade name, manufactured by Shin-Nakamura Chemical Co., Ltd.) as monomer B and 40 parts of acrylic acid as monomer C were used. In addition, 1 part of azobisisobutyronitrile as a radical polymerization initiator and 0.2 parts of α-(methyl trithiocarbonate)-S-phenyl acetic acid as a chain transfer gent were used. Then, hydrophilic segment c5 of dispersion resin A5 was prepared by using reaction conditions in accordance with the preparation of the hydrophobic segment carried out in Example 4. The hydrophilic segment c5 thus obtained had a weight average molecular weight of 3,200 in terms of polystyrene. At this time, the component ratio of monomer C in the hydrophilic segment was 80% by mass in mass ratio.

Preparation of Dispersion Resin A5

As raw materials of dispersion resin A5, 50 parts of hydrophilic segment c5 prepared as described above and 50 parts of 2-phenoxy ethyl acrylate as monomer A for forming a hydrophobic segment were used. The raw materials and 0.4 parts of azobisisobutyronitrile as a radical polymerization initiator were dissolved in N,N-dimethylformamide and reacted for 10 hours in an oil bath at 70° C. under argon flow. Next, the reaction product was cooled to room temperature and then dispersed in 1,000 parts of hexane to remove the unreacted product by precipitation purification, followed by drying under reduced pressure to obtain dispersion resin A5. The resulting dispersion resin A5 is a block polymer in which the monomer A is copolymerized in the hydrophobic segment and the monomers B and C are copolymerized in the hydrophilic segment. The dispersion resin A5 thus obtained had a weight average molecular weight of 7,400 in terms of polystyrene and an acid value of 312 mgKOH/g. Further, the composition ratio of the monomer A to the monomer B in the dispersion resin A5 is (monomer A):(monomer B)=5:1.

Preparation of Pigment-Dispersed Liquid k5

First, the following components including the dispersion resins A5 prepared as described above were mixed together and then heated in a water bath at 70° C., thereby completely dissolving the resin portion. To the solution was added 15 parts of carbon black (MCF88, manufactured by Mitsubishi Chemical Corporation), which was the same as one used in Example 1. Subsequently, pigment-dispersed liquid k5 was prepared in the same manner as described in Example 1.

| Composition of Pigment-Dispersed Liquid k5 | |
|---|---|
| Dispersion resin A5 | 15 parts |
| Potassium hydroxide | 5 parts |
| Isopropyl alcohol | 10 parts |
| Ion-exchanged water | 55 parts |

Preparation of Black Ink K5

Black ink K5 was prepared using the same compositions and procedures as those in Example 1 except that the pigment-dispersed liquid k5 prepared as described above was used in stead of the pigment-dispersed liquid k1 used in the preparation of Black ink K1 in Example 1.

Evaluation

The evaluation of black ink K5 prepared as described above was evaluated according to the same evaluation procedures and evaluation criteria as those of Example 1. The evaluation results are shown in Table 5 below.

TABLE 5

| | | Evaluation Results | | |
|---|---|---|---|---|
| Evaluation item | Ink No. | Test A Abrasion resistance | Test B Ejection stability | Test C Storage stability |
| Example 5 | K5 | ○ | □ | ○ |

As described above, Black ink K5 was excellent in any of the abrasion of an image and the ejection stability and storage stability of the ink. In particular, with respect to the ejection stability of the ink, Black ink K5 was excellent in the same level as that of Black ink K1.

Example 6

The present example describes the use of a block copolymer containing a hydrophobic segment and a hydrophilic segment in which the hydrophobic segment is formed of monomer A and monomer B as a dispersion resin.

Preparation of Dispersion Resin A6

Preparation of Hydrophobic Segment b6

As raw materials of the hydrophobic segment, 44 parts of 2-phenoxydiethylene glycol acrylate as monomer A and 50 parts of NK Ester M-230G (trade name, manufactured by Shin-Nakamura Chemical Co., Ltd.) as monomer B were used. In addition, 1 part of azobisisobutyronitrile as a radical polymerization initiator and 0.2 parts of α-(methyltrithiocarbonate)-S-phenyl acetic acid as a chain transfer agent were used. Then, hydrophobic segment b6 of the dispersion resin A6 was prepared by using reaction conditions in accordance with the preparation of the hydrophobic segment carried out in Example 4. The hydrophobic segment b6 thus obtained had a weight average molecular weight of 5,800 in terms of polystyrene.

Preparation of Dispersion Resin A6

As raw materials of dispersion resin A6, 94 parts of hydrophobic segment b6 prepared as described above and 6 parts of acrylic acid as monomer C for forming the hydrophilic segment were used. The raw materials and 0.4 parts of azobisisobutyronitrile as a radical polymerization initiator were dissolved in N,N-dimethylformamide and reacted for 30 hours in an oil bath at 70° C. under argon flow. After that, the reaction product was cooled to room temperature and then dispersed in 1,000 parts of hexane to remove the unreacted product by precipitation purification, followed by drying under reduced pressure to obtain dispersion resin A6. The resulting dispersion resin A6 is a block polymer in which the monomers A and B are copolymerized in the hydrophobic segment and the monomer C is copolymerized in the hydrophilic segment. The dispersion resin A6 thus obtained had a weight average molecular weight of 8,400 in terms of polystyrene and an acid value of 43 mgKOH/g. Further, the composition ratio of the monomer A to the monomer B in the dispersion resin A6 is (monomer A):(monomer B)=0.88:1. In addition, the composition ratio of monomer C of the hydrophilic segment is 100% by mass in mass ratio.

Preparation of Pigment-Dispersed Liquid k6

Pigment-dispersed liquid k6 was prepared in the same manner as in Example 1 except that the dispersion resin A6 prepared as described above was used in place of the dispersion resin A1 used in preparation of the pigment dispersion liquid k1 in Example 1.

Preparation of Black Ink K6

Black ink K6 was prepared using the same compositions and procedures as those of Example 1 except that the pigment-dispersed liquid k6 prepared as described above was used in stead of the pigment-dispersed liquid k1 used in the preparation of Black ink K1 in Example 1.

Evaluation

The evaluation of Black ink K6 prepared as described above was evaluated according to the same evaluation procedures and evaluation criteria as those of Example 1. The evaluation results are shown in Table 6 below.

TABLE 6

| | | Evaluation Results | | |
|---|---|---|---|---|
| Evaluation item | Ink No. | Test A Abrasion resistance | Test B Ejection stability | Test C Storage stability |
| Example 6 | K6 | ○ | □ | ○ |

As described above, Black ink K6 was excellent in any of the abrasion of an image and the ejection stability and storage stability of the ink. In particular, with respect to the ejection stability of the ink, Black ink K6 was excellent in the same level as that of Black ink K1.

Example 7

The present example describes the use of a block copolymer containing a hydrophobic segment and a hydrophilic segment in which the hydrophobic segment is formed of monomer A, monomer B, and monomer C as a pigment dispersion resin.

Preparation of Dispersion Resin A7

Preparation of Hydrophilic Segment c7

As raw materials of the hydrophilic segment c7, 10 parts of acrylic acid as monomer C, 1 part of azobisisobutyronitrile as a radical polymerization initiator and 0.2 parts of α-(methyltrithiocarbonate)-S-phenyl acetic acid as a chain transfer gent were used. Then, hydrophobic segment c7 of dispersion resin A7 was prepared by using reaction conditions in accordance with the preparation of the hydrophobic segment carried out in Example 4. The hydrophilic segment c7 thus obtained had a weight average molecular weight of 600 in terms of polystyrene.

Preparation of Dispersion Resin A7

As raw materials of dispersion resin A7, 10 parts of the above hydrophilic segment c7, 60 parts of benzyl acrylate as monomer A for forming a hydrophobic segment, 20 parts of NK Ester N-90G as monomer B, and parts of acrylic acid as monomer C were used. In addition, the raw materials and 0.4 parts of azobisisobutyronitrile as a radical polymerization initiator were dissolved in N,N-dimethylformamide and reacted for 13 hours in an oil bath at 70° C. under argon flow. After that, the reaction product was cooled to room temperature and then dispersed in 1,000 parts of hexane to remove the unreacted product by precipitation purification, followed by drying under reduced pressure to obtain dispersion resin A7. The resulting dispersion resin A7 is a block polymer in which the monomers A, B, and C are copolymerized in the hydrophobic segment and the monomer C is copolymerized in the hydrophilic segment. The dispersion resin A7 thus obtained had a weight average molecular weight of 7,400 in terms of polystyrene and an acid value of 156 mgKOH/g. Further, the composition ratio of the monomer A to the monomer B in the dispersion resin A7 is (monomer A):(monomer B)=3:1. In addition, the composition ratio of the monomer A to the monomer C in the hydrophobic segment is (monomer A):(monomer C)=6:1. Further, the composition ratio of monomer C of the hydrophilic segment is 100% by mass in mass ratio.

Preparation of Pigment-Dispersed Liquid k7

First, the following components including the dispersion resins A7 prepared as described above were mixed together and then heated in a water bath at 70° C., thereby completely dissolving the resin portion. To the resulting solution was added 15 parts of carbon black (MCF88, manufactured by Mitsubishi Chemical Corporation), which was the same as one used in Example 1. Then, pigment-dispersed liquid k7 was prepared in the same manner as described in Example 1.

| Composition of Pigment-Dispersed Liquid k7 | |
| --- | --- |
| Dispersion resin A7 | 15 parts |
| Potassium hydroxide | 3 parts |
| Isopropyl alcohol | 10 parts |
| Ion-exchanged water | 57 parts |

Preparation of Black Ink K7

Black ink K7 was prepared using the same compositions and procedures as those of Example 1 except that the pigment-dispersed liquid k7 prepared as described above was used in stead of the pigment-dispersed liquid k1 used in the preparation of Black ink K1 in Example 1.

Evaluation

The evaluation of black ink K7 prepared as described above was evaluated according to the same evaluation procedures and evaluation criteria as those of Example 1. The evaluation results are shown in Table 7 below.

TABLE 7

| | | Evaluation Results | | |
| --- | --- | --- | --- | --- |
| Evaluation item | Ink No. | Test A Abrasion resistance | Test B Ejection stability | Test C Storage stability |
| Example 7 | K7 | ○ | □ | □ |

As described above, Black ink K7 was excellent in any of the abrasion of an image and the ejection stability and storage stability of the ink. In particular, with respect to the ejection stability and storage stability of the ink, Black ink K7 was excellent in the same level as that of Black ink K1.

Example 8

This example describes the use of a graft copolymer containing a hydrophobic segment in the main chain and a hydrophilic segment in the side chain as a pigment dispersion resin.

Preparation of Dispersion Resin A8

Preparation of Hydrophilic Segment c8

As raw materials of the hydrophilic segment c8 that constitutes the side chain unit of dispersion resin A8, 8 parts of acrylic acid as monomer C and 2 parts of 2-hydroxyethyl acrylate were used. In addition, 1 part of α-methyl styrene dimer as a chain transfer agent and 0.2 parts of azobisisobutyronitrile as a radical polymerization initiator were used. Then, using the materials, radical polymerization was carried out while dropping the raw materials for 3 hours under reflux of $N_2$ at a polymerization temperature of 110° C. in 300 parts of 1-methoxy-2-propanol. After completing the dropping, the polymerization reaction was continued for additional 3 hours at 110° C. After that, the reaction product was cooled to room temperature and then dispersed in 1,000 parts of hexane to remove the unreacted product by precipitation purification, followed by drying under reduced pressure to obtain a hydrophilic segment c8. At this time, the hydrophilic segment c8 to be provided as a side chain unit of the dispersion resin A8 had a weight average molecular weight of 600.

(Preparation of Dispersion Resin A8)

First, 10 parts of the hydrophilic segment c8 obtained as described above was used. The segment was dissolved in 300 parts of 1-methoxy-2-propanol, while monomers that constitute a main chain unit as mentioned below were mixed with a polymerization initiator. As the monomers constituting the main chain unit, 40 parts of 2-phenoxydiethylene glycol acrylate as monomer A and 50 parts of Blemmer AE-400 (manufactured by NOF Corporation) as monomer B were used. In addition, 1 part of azobisisobutyronitrile was used as a radical polymerization initiator. Subsequently, a mixture of the above monomers with the polymerization initiator was dropped into the 1-methoxy-2-propanol in which the hydrophilic segment c8 was previously dissolved, thereby carrying out radical polymerization. At this time, the polymerization temperature was set to 110° C. and the dropping was then carried out for 3 hours under reflux of $N_2$. After completing the dropping, the polymerization reaction was carried out at 110° C. for additional 3 hours. Subsequently, the reaction product was cooled to room temperature and then dispersed in 1,000 parts of hexane to remove the unreacted product by precipitation purification, followed by drying under reduced pressure to obtain dispersion resin A8. The resulting dispersion resin A8 is a graft copolymer having a hydrophobic segment as a main chain unit and a hydrophilic segment c8 as a side chain unit. The dispersion resin A8 thus obtained had a weight average molecular weight of 7,800 and an acid value of 62 mgKOH/g. Further, the composition ratio of the monomer A to the monomer B in the hydrophobic segment is (monomer A):(monomer B)=0.8:1. Further, the composition ratio of monomer C of the hydrophilic segment is 80% by mass in mass ratio.

Preparation of Pigment-Dispersed Liquid k8

First, the following components including the dispersion resin A8 prepared as described above were mixed together and then heated in a water bath at 70° C., thereby completely dissolving the resin portion. To the resulting solution was added 15 parts of carbon black (MCF88, manufactured by Mitsubishi Chemical Corporation), which was the same as one used in Example 1. Then, pigment-dispersed liquid k8 was prepared in the same manner as described in Example 1.

| Composition of Pigment-Dispersed Liquid k8 | |
|---|---|
| Dispersion resin A8 | 15 parts |
| Potassium hydroxide | 1 parts |
| Isopropyl alcohol | 10 parts |
| Ion-exchanged water | 59 parts |

Preparation of Black Ink K8

Black ink K8 was prepared using the same compositions and procedures as those of Example 1 except that the pigment-dispersed liquid k8 prepared as described above was used in stead of the pigment-dispersed liquid k1 used in the preparation of Black ink K1 in Example 1.

Evaluation

The evaluation of Black ink K8 prepared as described above was evaluated according to the same evaluation procedures and evaluation criteria as those of Example 1. The evaluation results are shown in Table 8 below.

TABLE 8

| | | Evaluation Results | | |
|---|---|---|---|---|
| Evaluation item | Ink No. | Test A Abrasion resistance | Test B Ejection stability | Test C Storage stability |
| Example 8 | K8 | ○ | □ | ○ |

As described above, Black ink K8 was excellent in any of the abrasion of an image and the ejection stability and storage stability of the ink. In particular, with respect to the ejection stability of the ink, Black ink K8 was excellent in the same level as that of Black ink K1.

Examples 9 to 14

Examples 9 to 14 describe dispersion resins A9 to A14 having different composition ratios of the monomer A to the monomer B in the hydrophobic segments constituting the main chain units of the graft copolymers, respectively. In Table 9, the composition ratios of the monomer A to the monomer B, which were used for preparing the main chain units of the respective pigment-dispersed resins used in Examples 9 to 14, respectively.

Preparation of Dispersion Resins A9 to A14

Preparation of Hydrophilic Segment c9

As raw materials of the hydrophilic segment c9 that constitutes the side chain unit of the dispersion resins A9 to A14, 25 parts of acrylic acid as monomer C was used. In addition, 1 part of α-methyl styrene dimer as a chain transfer agent and 0.2 parts of azobisisobutyronitrile as a radical polymerization initiator were used. Then, radical polymerization was carried out by dropping the raw material mixture for 3 hours under reflux of $N_2$ at a polymerization temperature of 110° C. in 300 parts of 1-methoxy-2-propanol. After completing the dropping, the polymerization reaction was continued for additional 3 hours at 110° C. After that, the reaction product was cooled to room temperature and then dispersed in 1,000 parts of hexane to remove the unreacted product by precipitation purification, followed by drying under reduced pressure to obtain a hydrophilic segment c9. The hydrophilic segment c9 had a weight average molecular weight of 530.

Preparation of Dispersion Resins A9 to A14

The hydrophilic segment c9 constituting the side chain unit obtained as described above was used in preparing each of the dispersion resin A9 to A14 as follows: 25 parts of the above hydrophilic segment c9 was previously dissolved in 300 parts of 1-methoxy-2-propanol. Then, with this solution were mixed monomers A and B that constitute the main chain unit and a radical polymerization initiator as described below, thereby carrying out radical polymerization. As monomers that constitute the main chain unit were used 2-phenoxydiethylene glycol acrylate as monomer A and Blemmer AE-400 (trade name, manufactured by NOF Corporation) as a monomer B in mixing amounts as shown in Table 9. In addition, 1 part of azobisisobutyronitrile was used as the radical polymerization initiator.

TABLE 9

| Compositions of main chain units of dispersion resins A9 to A14 | | |
|---|---|---|
| | Mixing ratio (part) | |
| | Monomer A | Monomer B |
| Example 9 | 32.5 | 32.5 |
| Example 10 | 50 | 25 |
| Example 11 | 60 | 15 |
| Example 12 | 66.7 | 8.3 |
| Example 13 | 68.2 | 6.8 |
| Example 14 | 68.75 | 6.25 |

A mixture of monomers A and B in amounts shown in Table 9 with a polymerization initiator was dropped into the 1-methoxy-2-propanol as described above in which the hydrophilic segment c9 was previously dissolved, thereby carrying out radical polymerization. At this time, the polymerization temperature was set to 110° C. and the dropping was then carried out for 3 hours under reflux of $N_2$. After completing the dropping, the polymerization reaction was carried out at 110° C. for additional 3 hours. Subsequently, the reaction product was cooled to room temperature and then dispersed in 1,000 parts of hexane to remove the unreacted product by precipitation purification, followed by drying under reduced pressure to obtain dispersion resins A9 to A14. Any of the resulting dispersion resin A9 to A14 is a graft copolymer having a hydrophobic segment as the main chain unit and a hydrophilic segment c9 as the side chain unit.

Table 10 shows the composition ratio of the monomer A to the monomer B as well as the average molecular weight and the acid value thereof in the hydrophobic segment of any of the dispersion resins A9 to A14 obtained as described above. In addition, the composition ratio of monomer C of the hydrophilic segment of each of the dispersion resins A9 to A14 is 100% by mass in mass ratio.

TABLE 10

| Characteristics of dispersion resins A9 to A14 | | | | |
|---|---|---|---|---|
| Dispersion resin No. | Composition ratio | | Weight average molecular weight of dispersion resin | Acid value of dispersion resin (mgKOH/g) |
| | Monomer A | Monomer B | | |
| Example 9 | A9 | 1 | 1 | 7,000 | 195 |
| Example 10 | A10 | 2 | 1 | 6,700 | 201 |
| Example 11 | A11 | 4 | 1 | 6,300 | 198 |
| Example 12 | A12 | 8 | 1 | 7,500 | 195 |

TABLE 10-continued

Characteristics of dispersion resins A9 to A14

| | Dispersion resin No. | Composition ratio | | Weight average molecular weight of dispersion resin | Acid value of dispersion resin (mgKOH/g) |
|---|---|---|---|---|---|
| | | Monomer A | Monomer B | | |
| Example 13 | A13 | 10 | 1 | 6,600 | 205 |
| Example 14 | A14 | 11 | 1 | 7,100 | 200 |

Preparation of Pigment-Dispersed Liquids k9 to k14

First, the following components including any of the dispersion resins A9 to A14 prepared as described above were mixed together and then heated in a water bath at 70° C., thereby completely dissolving the resin portion. To the solution was added 15 parts of carbon black (MCF88, manufactured by Mitsubishi Chemical Corporation), which was the same as one used in Example 1. Then, pigment-dispersed liquids k9 to k14 were prepared in the same manner as described in Example 1.

| Composition of Pigment-Dispersed Liquids k9 to k14 | |
|---|---|
| Dispersion resin (one of A9 to A14) | 15 parts |
| Potassium hydroxide | 3 parts |
| Isopropyl alcohol | 10 parts |
| Ion-exchanged water | 57 parts |

Preparation of Black Inks K9 to K14

Black inks K9 to K14 were prepared using the same compositions and procedures as those of Example 1 except that the pigment-dispersed liquids k9 to k14 prepared as described above were used in stead of the pigment-dispersed liquid k1 used in the preparation of Black ink K1 in Example 1.

Evaluation

The evaluations of Black inks K9 to K14 prepared as described above were evaluated according to the same evaluation procedures and evaluation criteria as those of Example 1. The evaluation results are shown in Table 11 below.

TABLE 11

| | | Evaluation Results | | |
|---|---|---|---|---|
| Evaluation item | No. | Test A Abrasion resistance | Test B Ejection stability | Test C Storage stability |
| Example 9 | K9 | ○ | □ | □ |
| Example 10 | K10 | ○ | □ | □ |
| Example 11 | K11 | □ | □ | □ |
| Example 12 | K12 | □ | □ | □ |
| Example 13 | K13 | □ | □ | □ |
| Example 14 | K14 | ○ | ○ | ○ |

As described above, Black inks K9 to K14 were excellent in any of the abrasion of an image and the ejection stability and storage stability of the ink. In particular, with respect to any items, Black inks K11 to K13 were excellent in the same level as that of Black ink K1.

Examples 15 to 19

Examples 15 to 19 describe pigment-dispersed resins A15 to A19 having different composition ratios of the monomer A, the monomer B, and the monomer C in the hydrophobic segments constituting the main chain units of the graft copolymers, respectively. In Table 12, the composition ratios of the monomer A, the monomer B, and the monomer C, which were used for preparing the main chain units of the respective pigment-dispersed resins used in Examples 15 to 19, respectively.

Preparation of Dispersion Resin A15 to A1

Preparation of Hydrophilic Segment c10

As raw materials of the hydrophilic segment c10 that constitutes the side chain unit of the dispersion resin A15 to A19, 20 parts of acrylic acid as monomer C was used. In addition, 1 part of α-methyl styrene dimer as a chain transfer agent and 0.2 parts of azobisisobutyronitrile as a radical polymerization initiator were used. Then, using the materials, radical polymerization was carried out by dropping the raw material mixture for 3 hours under reflux of $N_2$ at a polymerization temperature of 110° C. in 300 parts of 1-methoxy-2-propanol. After completing the dropping, the polymerization reaction was continued for additional 3 hours at 110° C. After that, the reaction product was cooled to room temperature and then dispersed in 1,000 parts of hexane to remove the unreacted product by precipitation purification, followed by drying under reduced pressure to obtain a hydrophilic segment c10. The hydrophilic segment c10 had a weight average molecular weight of 500.

Preparation of Dispersion Resins A15 to A19

The hydrophilic segment c10 constituting the side chain unit obtained as described above was used in preparing each of the dispersion resin A15 to A19 as follows: 20 parts of the above hydrophilic segment c10 was previously dissolved in 300 parts of 1-methoxy-2-propanol. Then, with the resulting solution were mixed monomers A, B, and C that constitute the main chain unit and a radical polymerization initiator, thereby carrying out radical polymerization. As the monomers that constitute the main chain unit were used 2-phenoxydiethylene glycol acrylate as monomer A, Blemmer AE-400 (trade name, manufactured by NOF Corporation) as monomer B, and acrylic acid as monomer C in mixing amounts as shown in Table 12. In addition, 1 part of azobisisobutyronitrile was used as the radical polymerization initiator.

TABLE 12

Compositions of monomers that constitute main chain units of dispersion resins A15 to A19

| | Dispersion resin No. | Mixing ratio (part) | | |
|---|---|---|---|---|
| | | Monomer A | Monomer B | Monomer C |
| Example 15 | A15 | 56 | 10 | 14 |
| Example 16 | A16 | 62 | 10 | 8 |
| Example 17 | A17 | 65 | 10 | 5 |
| Example 18 | A18 | 64 | 12 | 4 |
| Example 19 | A19 | 68 | 8 | 4 |

A mixture of monomers A, B, and C in amounts shown in Table 12 with a polymerization initiator was dropped into the 1-methoxy-2-propanol as described above in which the hydrophilic segment c10 was dissolved, thereby carrying out radical polymerization. At this time, the polymerization temperature was set to 110° C. and the dropping was then carried out for 3 hours under reflux of $N_2$. After completing the dropping, the polymerization reaction was carried out at 110° C. for additional 3 hours. Subsequently, the reaction product was cooled to room temperature and then dispersed in 1,000 parts of hexane to remove the unreacted product by precipitation purification, followed by drying under reduced pressure to obtain dispersion resins A15 to A19. Any of the resulting dispersion resin A15 to A19 is a graft copolymer having a hydrophobic segment as the main chain unit and a hydrophilic segment c10 as the side chain unit.

Table 13 shows the composition ratio of the monomer A to the monomer B in the hydrophobic segment of the dispersion resins A15 to A19 obtained as described above as well as the composition ratio of the monomer A to the monomer C in the hydrophobic segment, and the weight average molecular weight and the acid value of the dispersion resins. In addition, the composition ratio of monomer C of the hydrophilic segment of each of the dispersion resins A15 to A19 is 100% by mass in mass ratio.

TABLE 13

Characteristics of dispersion resins A15 to A19

| | Dispersion resin No. | Composition ratio Monomer A:B | Composition ratio Monomer A:C | Weight average molecular weight of dispersion resin | Acid value of dispersion resin (mgKOH/g) |
|---|---|---|---|---|---|
| Example 15 | A15 | 5.6:1 | 4:1 | 6,700 | 235 |
| Example 16 | A16 | 6.2:1 | 7.8:1 | 7,200 | 205 |
| Example 17 | A17 | 6.5:1 | 13:1 | 6,300 | 198 |
| Example 18 | A18 | 5.3:1 | 16:1 | 6,500 | 190 |
| Example 19 | A19 | 8.5:1 | 17:1 | 6,000 | 192 |

Preparation of Pigment-Dispersed Liquids k15 to k19

First, the following components including any one of the dispersion resins A15 to A19 prepared as described above were mixed together and then heated in a water bath at 70° C., thereby completely dissolving the resin portion. To the solution was added 15 parts of carbon black (MCF88, manufactured by Mitsubishi Chemical Corporation), which was the same as one used in Example 1. Then, pigment-dispersed liquids k15 to k19 were prepared in the same manner as described in Example 1.

| Composition of Pigment-Dispersed liquids A15 to k19 | |
|---|---|
| Dispersion resin (one of A15 to A19) | 15 parts |
| Potassium hydroxide | 3 parts |
| Isopropyl alcohol | 10 parts |
| Ion-exchanged water | 57 parts |

Preparation of Blacks Inks K15 to K19

Black inks K15 to 19 were prepared using the same compositions and procedures as those of Example 1 except that the pigment-dispersed liquids k15 to K19 prepared as described above were used in stead of the pigment-dispersed liquid k1 used in the preparation of Black ink K1 in Example 1.

Evaluation

The evaluation of Black inks K15 to K19 prepared as described above were evaluated according to the same evaluation procedures and evaluation criteria as those of Example 1. The evaluation results are shown in Table 14 below.

TABLE 14

Evaluation Results

| Evaluation item | Ink No. | Test A Abrasion resistance | Test B Ejection stability | Test C Storage stability |
|---|---|---|---|---|
| Example 15 | K15 | ○ | □ | □ |
| Example 16 | K16 | □ | □ | □ |
| Example 17 | K17 | □ | □ | □ |
| Example 18 | K18 | □ | □ | □ |
| Example 19 | K19 | ○ | ○ | □ |

As described above, Black inks K15 to K19 were excellent in any of the abrasion resistance of an image and the ejection stability and storage stability of the ink. In particular, with respect to any of items, Black inks K16 to K18 were excellent in the same level as that of Black ink K1.

Comparative Example 1

The present comparative example describes a pigment ink which does not contain a polymer prepared by copolymerization of monomers A, B and C but contains a resin A20 prepared by copolymerization of monomers A and C as described below.

Preparation of Resin A20

As monomers as raw materials of resin A20, 60 parts of 2-phenoxydiethylene glycol methacrylate, 30 parts of acrylic acid, and 10 parts of n-butyl methacrylate were used. In addition, 1 part of azobisisobutyronitrile as a radical polymerization initiator was used. A mixture of the above monomers and the radical polymerization initiator were subjected to radical polymerization by dropping the mixture into 300 parts of 1-methoxy-2-propanol. At this time, the polymerization temperature was set to 110° C. and the dropping was then carried out for 3 hours under reflux of $N_2$. After completing the dropping, the polymerization reaction was carried out at 110° C. for additional 3 hours. Subsequently, the reaction product was cooled to room temperature and then dispersed in 1,000 parts of hexane to remove the unreacted product by precipitation purification, followed by drying under reduced pressure to obtain resin A20. The resin A20 is a random copolymer. The resin A20 thus obtained had a weight average molecular weight of 6,200 and an acid value of 200 mgKOH/g.

Preparation of Black Ink K20

The pigment-dispersed liquid k2 prepared in Example 2, in which the commercially available polymer dispersion resin was used as a dispersant, was mixed with the components having the composition ratios as described below including the resin A20 obtained as described above. Black ink K20 was thus prepared from the mixture by routine procedures.

| | |
|---|---|
| Pigment-dispersed liquid k2 (3 parts in terms of pigment concentration) | 20 parts |
| Resin A2 | 3 parts |
| Glycerin | 10 parts |
| Ethylene glycol | 5 parts |
| N-methyl pyrrolidone | 5 parts |
| Acetylenol EH (manufactured by Kawaken Fine Chemicals Co., Ltd.) | 1 part |
| Ion-exchanged water | 56 parts |

Evaluation

The evaluation of Black ink K20 prepared as described above was evaluated according to the same evaluation procedures and evaluation criteria as those of Example 1. The evaluation results are shown in Table 15 below.

TABLE 15

| | | Evaluation Results | | |
|---|---|---|---|---|
| Evaluation item | Ink No. | Test A Abrasion resistance | Test B Ejection stability | Test C Storage stability |
| Comparative example 1 | K20 | X | x | x |

As described above, Black ink K20 of Comparative Example 1 could not satisfy any of characteristics, the abrasion resistance of an image, and the ejection stability and storage stability of ink.

Comparative Example 2

The present comparative example describes a conventional pigment ink containing resin fine particles (resin emulsion).

Preparation of Black Ink K21

The pigment-dispersed liquid k2 prepared in Example 2, in which the commercially available polymer dispersion resin was used as a dispersant, and resin fine particles were used. The materials described below were mixed together in the composition ratios as described below. Black ink K21 was thus prepared from the mixture by routine procedures.

| | |
|---|---|
| Pigment-dispersed liquid k2 (3 parts in terms of pigment concentration) | 20 parts |
| Resin fine particle, JONCRYL 7600 (trade name) | 3 parts |
| Glycerin | 10 parts |
| Ethylene glycol | 5 parts |
| N-methyl pyrrolidone | 5 parts |
| Acetylanol EH (manufactured by Kawaken Fine Chemicals Co., Ltd.) | 1 part |
| Ion-exchanged water | 56 parts |

Evaluation

The evaluation of Black ink K21 prepared as described above was evaluated according to the same evaluation procedures and evaluation criteria as those of Example 1. The evaluation results are shown in Table 16 below.

TABLE 16

| | | Evaluation Results | | |
|---|---|---|---|---|
| Evaluation item | Ink No. | Test A Abrasion resistance | Test B Ejection stability | Test C Storage stability |
| Comparative example 2 | K21 | Δ | x | x |

As described above, Black ink K21 of Comparative Example 2 is improved compared with Black ink K20 in terms of the abrasion resistance of an image but not satisfied with respect to any of the abrasion resistance of an image and the ejection stability and storage stability of ink.

Consequently, according to the present invention, an ink having a high ejection stability and a high storage stability (dispersion stability) suitable for inkjet recording and also having an extremely improved abrasion resistance thereof to a printed matter recorded on glossy paper, compared with the conventional one, can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-162273, filed Jun. 12, 2006, which is hereby incorporated by reference herein in its entirety.

What is claimed is:

1. An inkjet pigment ink comprising:

a pigment;

a water-soluble solvent;

water; and a copolymer, wherein the copolymer is a graft copolymer obtained by copolymerization of: aromatic acrylate (monomer A); (meth)acrylate added with ethylene oxide having a polymerization degree of 5 or more (monomer B); and acrylic acid (monomer C), wherein the graft copolymer has a hydrophilic segment formed by polymerization of a hydrophilic monomer as a side chain unit and a hydrophobic segment formed by polymerization of a hydrophobic monomer as a main chain unit, wherein the monomer used in the formation of the hydrophilic segment comprises the monomer C, wherein the monomer used in the formation of the hydrophobic segment comprises monomer A, monomer B, and monomer C, wherein the mass ratio of monomer A to monomer C (A:C) for the formation of the hydrophobic segment is 6:1 to 16:1, and wherein the mass ratio of monomer A to monomer B (A:B) for the formation of the hydrophobic segment is 4:1 to 10:1.

2. An inkjet pigment ink according to claim 1, wherein the graft copolymer is a dispersant for the pigment.

3. An inkjet pigment ink according to claim 1, wherein the graft copolymer has an acid value of 50 mgKOH/g to 300 mgKOH/g.

4. An inkjet pigment ink according to claim 1, wherein the monomer A is benzyl acrylate.

* * * * *